(12) United States Patent
Liu et al.

(10) Patent No.: US 10,928,837 B2
(45) Date of Patent: Feb. 23, 2021

(54) BANKED YET STRAIGHT FLIGHT

(71) Applicant: Facebook, Inc., Menlo Park, CA (US)

(72) Inventors: Zhang Liu, Oak Park, CA (US);
Amnon G. Talmor, Burbank, CA (US)

(73) Assignee: Facebook, Inc., Menlo Park, CA (US)

( * ) Notice: Subject to any disclaimer, the term of this patent is extended or adjusted under 35 U.S.C. 154(b) by 553 days.

(21) Appl. No.: 15/853,158

(22) Filed: Dec. 22, 2017

(65) Prior Publication Data
US 2018/0299907 A1 Oct. 18, 2018

Related U.S. Application Data

(60) Provisional application No. 62/485,335, filed on Apr. 13, 2017.

(51) Int. Cl.
*G05D 1/08* (2006.01)
*B64C 9/00* (2006.01)
*B64C 39/08* (2006.01)

(52) U.S. Cl.
CPC .......... *G05D 1/0808* (2013.01); *B64C 9/00* (2013.01); *B64C 39/08* (2013.01); *B64D 2211/00* (2013.01)

(58) Field of Classification Search
CPC .... B64C 5/06; B64C 5/08; B64C 9/00; B64C 39/10; G05D 1/0808
See application file for complete search history.

(56) References Cited

U.S. PATENT DOCUMENTS

| | | | | |
|---|---|---|---|---|
| 2,846,165 | A | * | 8/1958 | Axelson ............... B64C 23/076 244/90 R |
| 3,438,597 | A | * | 4/1969 | Kasper ..................... B64C 9/00 244/13 |
| 3,750,985 | A | | 8/1973 | Wheldon |
| 3,814,912 | A | | 6/1974 | Klein |
| 4,415,133 | A | * | 11/1983 | Phillips ................. B64C 31/00 244/53 R |

(Continued)

FOREIGN PATENT DOCUMENTS

| | | |
|---|---|---|
| EP | 3243749 A1 | 11/2017 |
| GB | 978141 A | 12/1964 |

(Continued)

OTHER PUBLICATIONS

Phillips, William. "Some Design Considerations for Solar-Powered Aircraft." NASA Technical Paper 1675. Jun. 1980. (Year: 1980).*

(Continued)

*Primary Examiner* — Philip J Bonzell
*Assistant Examiner* — Michael B. Kreiner
(74) *Attorney, Agent, or Firm* — Baker Botts L.L.P.

(57) ABSTRACT

In one embodiment, an aircraft includes one or more first wings configured to produce lift in a first direction when the aircraft is moving in a second direction that is substantially perpendicular to the first direction. The first wings may also produce a centripetal force when the aircraft is banking while moving in the second direction. The aircraft may also include one or more second wings affixed and oriented substantially perpendicular to the first wings and configured to produce a counter force in a third direction that is substantially perpendicular to both the first direction and the second direction. The counter force may reduce the centripetal force when the aircraft is banking.

13 Claims, 5 Drawing Sheets

(56) References Cited

U.S. PATENT DOCUMENTS

| | | | |
|---|---|---|---|
| 4,533,101 A | | 8/1985 | Patterson |
| 5,810,284 A | * | 9/1998 | Hibbs ................... B64C 39/10 244/13 |
| 5,918,835 A | | 7/1999 | Gerhardt |
| 6,315,242 B1 | * | 11/2001 | Eichstedt ................ B64B 1/02 244/125 |
| 6,497,600 B1 | * | 12/2002 | Levy ..................... A63H 27/00 446/34 |
| 6,931,247 B2 | * | 8/2005 | Cox ........................ B64C 3/42 455/431 |
| 7,093,789 B2 | * | 8/2006 | Barocela ............... B64C 39/10 244/30 |
| 7,802,756 B2 | * | 9/2010 | Kendall .................... B64C 3/42 244/45 R |
| 8,418,967 B2 | | 4/2013 | Hemmelgarn |
| 9,227,721 B1 | | 1/2016 | Nguyen |
| 10,042,360 B2 | * | 8/2018 | Nicoloff ............... F41G 7/2293 |
| 10,308,346 B2 | * | 6/2019 | Parks ........................ B64C 5/02 |
| 2003/0168552 A1 | | 9/2003 | Brown |
| 2010/0213309 A1 | * | 8/2010 | Parks ........................ B64C 3/16 244/46 |
| 2012/0104163 A1 | | 5/2012 | MacCready |
| 2014/0252156 A1 | * | 9/2014 | Hiebl ..................... B64C 39/02 244/3 |
| 2015/0251754 A1 | | 9/2015 | Vander Lind |
| 2015/0266571 A1 | | 9/2015 | Bevirt |
| 2016/0144969 A1 | * | 5/2016 | Rawdon ............... B64C 23/069 244/13 |
| 2016/0311545 A1 | | 10/2016 | Parks |

FOREIGN PATENT DOCUMENTS

| | | |
|---|---|---|
| GB | 2504132 A | 1/2014 |
| GB | 2536014 A | 9/2016 |
| KR | 20140044952 | 4/2014 |
| WO | WO 2011021206 A2 | 2/2011 |

OTHER PUBLICATIONS

EESR received from EPO for EP Patent Application No. 18160186.5-1010, May 7, 2018.

Flittie et al., Pathfinder Solar-powered Aircraft Flight Performance, AIAA paper, American Institute of Aeronautics and Astronautics, US, No. 98-4446, Aug. 10, 1998, pp. 618-632, XP00101453, Aug. 10, 1998.

Veldhuis, Propeller Wing Aerodynamic Interference, 24th International Congress of the Aeronautical Sciences, Oct. 24, 2014, XP055466725. Retrieved from the Internet: URL:https://www.researchgate.net/profile/Leo_Veldhuis/publication/27341924_Propeller_Wing_Aerodynamic_Interference/links/544a184a0cf244fe9ea62bc4/Propeller-Wing-Aerodynamic-Interference.pdf?origin=publication_detail. [retrieved on Apr. 12, 2018], Oct. 24, 2014.

International Search Report and Written Opinion for International Application No. PCT/US2018/012950, dated May 9, 2018.

EP Communication received from EPO for EP Patent Application No. 18160186.5-1010, Apr. 23, 2020.

International Search Report and Written Opinion for International Application No. PCT/US2018/013052, dated Apr. 25, 2018.

EESR received from EPO for EP Patent Application No. 18160204.6-1010, Aug. 27, 2018.

* cited by examiner

BANKED YET STRAIGHT FLIGHT

TECHNICAL FIELD

This disclosure generally relates to aerodynamics and solar-powered aircraft.

BACKGROUND

When an aircraft is in motion its wings produce a lifting force. Lift is a force that is directed perpendicular to the wing of the aircraft. Traditionally, when an aircraft is flying straight, its wings are level and lifting force is directed straight up. If the aircraft is maintaining a steady altitude, lifting force is equal to the force of gravity on the aircraft. When the aircraft is oriented in a banked position, the wings are tilted relative to the horizon. In a banked position, the direction of the lifting force is still perpendicular to the wing, but because the wing is banked, the direction of the lifting force is angled relative to the horizon. The angled lifting force may comprise a vertical component and a horizontal component. The horizontal component of the lifting force may cause a traditional aircraft in flight to turn. This horizontal component of the lifting force may also be referred to as a centripetal force.

SUMMARY OF PARTICULAR EMBODIMENTS

In particular embodiments, a vertical wing may be fixed proximate to the main wing of an aircraft. The vertical wing may enable the aircraft to orient itself in a banked orientation while simultaneously maintaining a straight flight path. When the aircraft is in a banked orientation, both the horizontal wing and the vertical wing may produce lifting forces that have horizontal and vertical components. The horizontal component of the lifting force produced by the vertical wing may be in a direction that is opposite to the horizontal component of the lifting force produced by the horizontal wing. If the magnitudes of these two forces are equal, the aircraft may be able to maintain the banked orientation without turning.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

In particular embodiments, a vertical wing may be fixed proximate to the main wing of an aircraft. The vertical wing may enable the aircraft to orient itself in a banked orientation while simultaneously maintaining a straight flight path. When the aircraft is in a banked orientation, both the horizontal wing and the vertical wing may produce lifting forces that have horizontal and vertical components. The horizontal component of the lifting force produced by the vertical wing may be in a direction that is opposite to the horizontal component of the lifting force produced by the horizontal wing. If the magnitudes of these two forces are equal, the aircraft may be able to maintain the banked orientation without turning.

In particular embodiments, a solar aircraft or hybrid aircraft (e.g., an aircraft that is powered in part by solar energy and in part by another form of energy) may be powered by sunlight that is gathered by one or more solar cells affixed to the wings or body of the aircraft and converted into electricity to power the aircraft's engine. In order to fly for extended periods of time (e.g., several days or weeks without stopping to re-fuel or re-charge batteries), it may be desirable for the solar panels to gather as much solar energy as possible during the day when the sun is shining. To increase the solar energy that is captured by solar cells, the solar cells may need to be pointed in a direction that allows as much sunlight as possible to be captured by the solar cells. Solar cells may be comprised within solar panels or may be installed directly onto the aircraft. The solar cells used by the aircraft may include any suitable type of system that captures sunlight and converts it to usable energy, including solar panels, photovoltaic cells, silicon cells, or any suitable material. Although this disclosure describes providing solar cells to an aircraft in a particular manner, this disclosure contemplates providing solar cells to an aircraft in any suitable manner.

During the middle of the day, when the Sun is high in the sky, solar cells that are laying flat on the surface of the aircraft may be able to capture a sufficient amount of solar energy to adequately power the aircraft. However, during sunrise and sunset the Sun is low in the sky and solar cells that are facing straight up may not capture as much solar energy as they could if they were tilted such that their surface area was exposed to more sunlight. Tilting solar panels to increase exposure to sunlight is a common practice among solar power users because it increases the total solar energy input during the day. However, solar cells on the aircraft may be incapable of tilting away from the surface of the aircraft because they may be fully affixed to the wings and body of the aircraft or it may otherwise be undesirable to tilt the solar cells off the surface of the aircraft. For example, tilting the solar cells off the surface of the aircraft may produce an excessing amount of drag on the aircraft. Therefore, it may be desirable to cause the entire aircraft to tilt so that the solar cells affixed to the aircraft's wings and body are angled toward the Sun. With the aircraft tilted toward the Sun, more surface area of the solar cells are exposed to sunlight. Tilting the aircraft in this manner may be referred to as tracking the Sun. In a traditional aircraft, tilting (or banking) the aircraft causes the aircraft to turn. Turning the aircraft may prevent continuous tracking of the Sun because as the aircraft turns, its bank angle in relation to the Sun changes. Turning the aircraft may prevent a sufficient amount of solar energy from being captured by the solar cells on the aircraft. Therefore, in order to increase the amount of solar energy captured by the solar cells, it may be desirable for the aircraft to fly in a banked orientation, but also in a straight line (e.g., without turning). Although this disclosure describes tracking the Sun in a particular manner, this disclosure contemplates tracking the Sun in any suitable manner.

Figure 1:
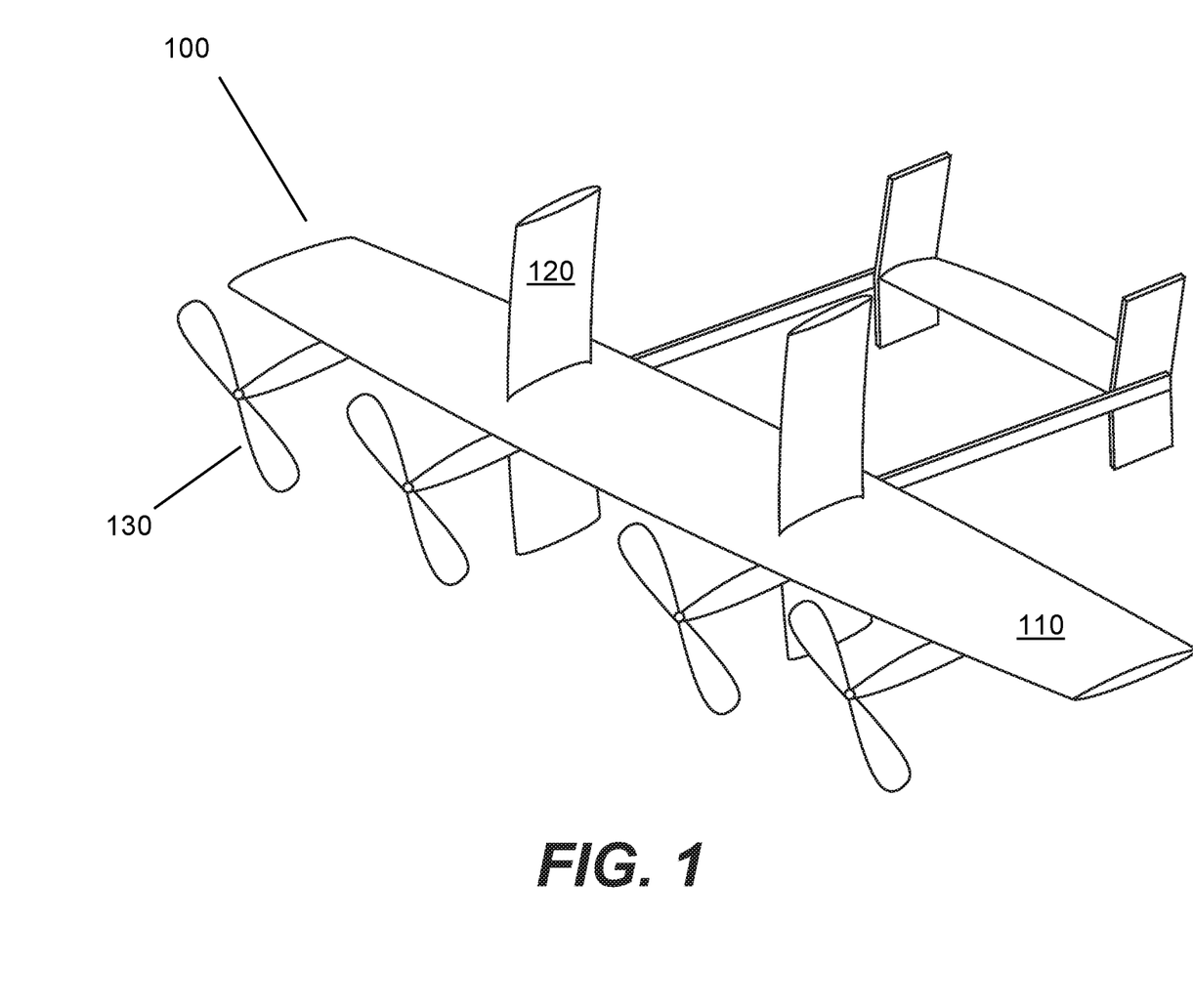
FIG. 1 illustrates an example aircraft that may maintain a straight flight path in a banked orientation.

To enable the aircraft to fly in a banked orientation without turning, one or more vertical wings may be affixed to the aircraft. FIG. 1 illustrates an example aircraft 100 that may maintain a straight flight path in a banked orientation. Aircraft 100 may comprise one or more first wings 110, one or more second wings 120, and one or more propellers 130. First wings 110 may produce lift in a first direction when the aircraft is moving in a second direction that is substantially perpendicular to the first direction. As an example and not by way of limitation, if the aircraft is moving forward, first wings 110 may produce lift that is directed upward. First wings 110 may be similar to wings of traditional aircraft. When aircraft 100 is in a banked orientation, first wings 110 may produce a centripetal force in the same direction as the bank orientation. As an example and not by way of limitation, if aircraft 100 is banked to the left (e.g., the aircraft rotates with respect to its longitudinal axis such that its left wing tip is below its right wing tip), first wings 110 may produce a centripetal (e.g., horizontal) force to the left. This centripetal force may cause aircraft 100 to turn to the left. Second wings 120 may be vertical wings, or may be any other suitable wing. Second wings 120 may be affixed to first wings 110 or may be affixed to the body of the aircraft (not shown in FIG. 1), or may be affixed to any other suitable location on the aircraft. In particular embodiments, second wings 120 may be oriented substantially perpendicular to first wings 110 and may be configured to produce a counter force in a third direction that is substantially perpendicular to both the first direction and the second direction, wherein the counter force reduces the centripetal force when the aircraft is banking. This is discussed in more detail below with reference to FIG. 4B. In particular embodiments, second wings 120 may rotate with respect to a vertical axis associated with aircraft 100. Aircraft 100 may be viewed on a three-dimensional plane, with the x-axis being referred to as a lateral axis (e.g., pitch axis), the y-axis being referred to as a longitudinal axis (e.g., roll axis), and the z-axis being referred to as a vertical axis (e.g., yaw axis). In particular embodiments, first wings 110 may extend along and be parallel to the lateral axis, and second wings 120 may extend along and be parallel to the vertical axis. Thus, second wings 120 may be perpendicular to both the lateral axis and the longitudinal axis. In particular embodiments, second wings 120 may have a symmetrical airfoil. This may mean that the upper surface of second wings 120 are the same shape as the lower surface of second wings 120. This may allow aircraft 100 to bank in either direction while it is in flight. In particular embodiments, when the aircraft is in a banked orientation, second wings 120 may produce lift that is perpendicular to the surface of second wings 120. In particular embodiments, second wings 120 may rotate with respect to the vertical axis associated with the aircraft. Rotating second wings 120 along the vertical axis may enable second wings 120 to produce lift in a desired direction (e.g., upward). In particular embodiments, solar cells may be affixed to second wings 120 as well as to first wings 110. Although this disclosure describes providing first wings 110 and second wings 120 in a particular manner, this disclosure contemplates providing first wings 110 and second wings 120 in any suitable manner.

Figure 2:
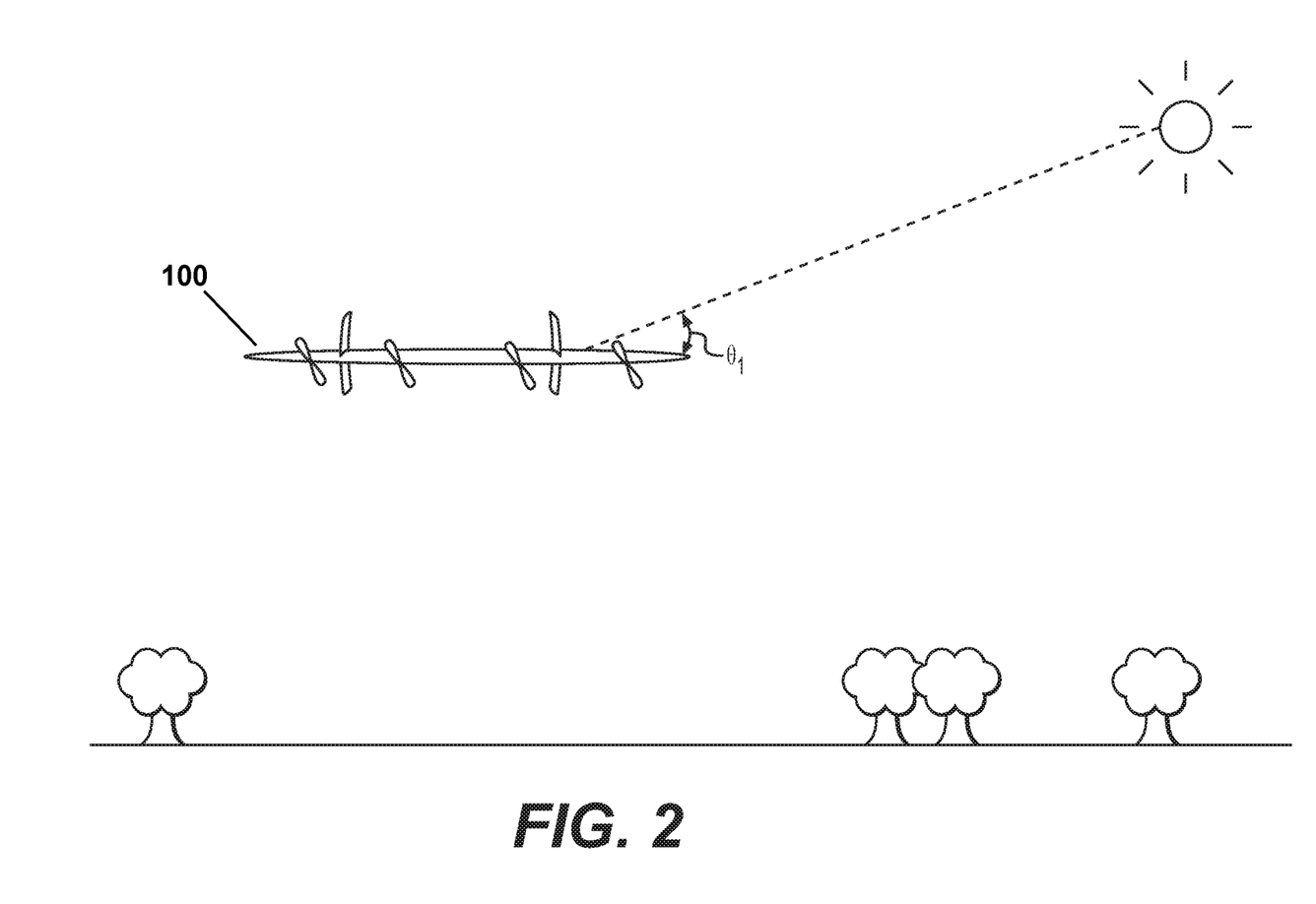
FIG. 2 illustrates an example aircraft that may maintain banked yet straight flight in an unbanked orientation.

FIG. 2 illustrates an example aircraft 100 that may maintain banked yet straight flight in an unbanked orientation. When aircraft 100 is flying in an unbanked orientation, first wings 110 may be oriented parallel to the horizon. The angle $\theta_1$ may represent the angle between first wings 110 and the sunlight emanating from the Sun. If the Sun is low in the sky (as is generally the case in the mornings and evenings), $\theta_1$ may be relatively small. To capture the most amount of sunlight, the angle between first wings 110 and the Sun may need to be 90 degrees, which would mean that the Sun is directly over aircraft 100. As the Earth rotates during the day, the Sun may appear lower and lower in the Sky and the angle between first wings 110 and the Sun may grow smaller. Thus, the ability for solar cells that are affixed to first wings 110 to capture sunlight may diminish when the sun is lower in the sky.

Figure 3:
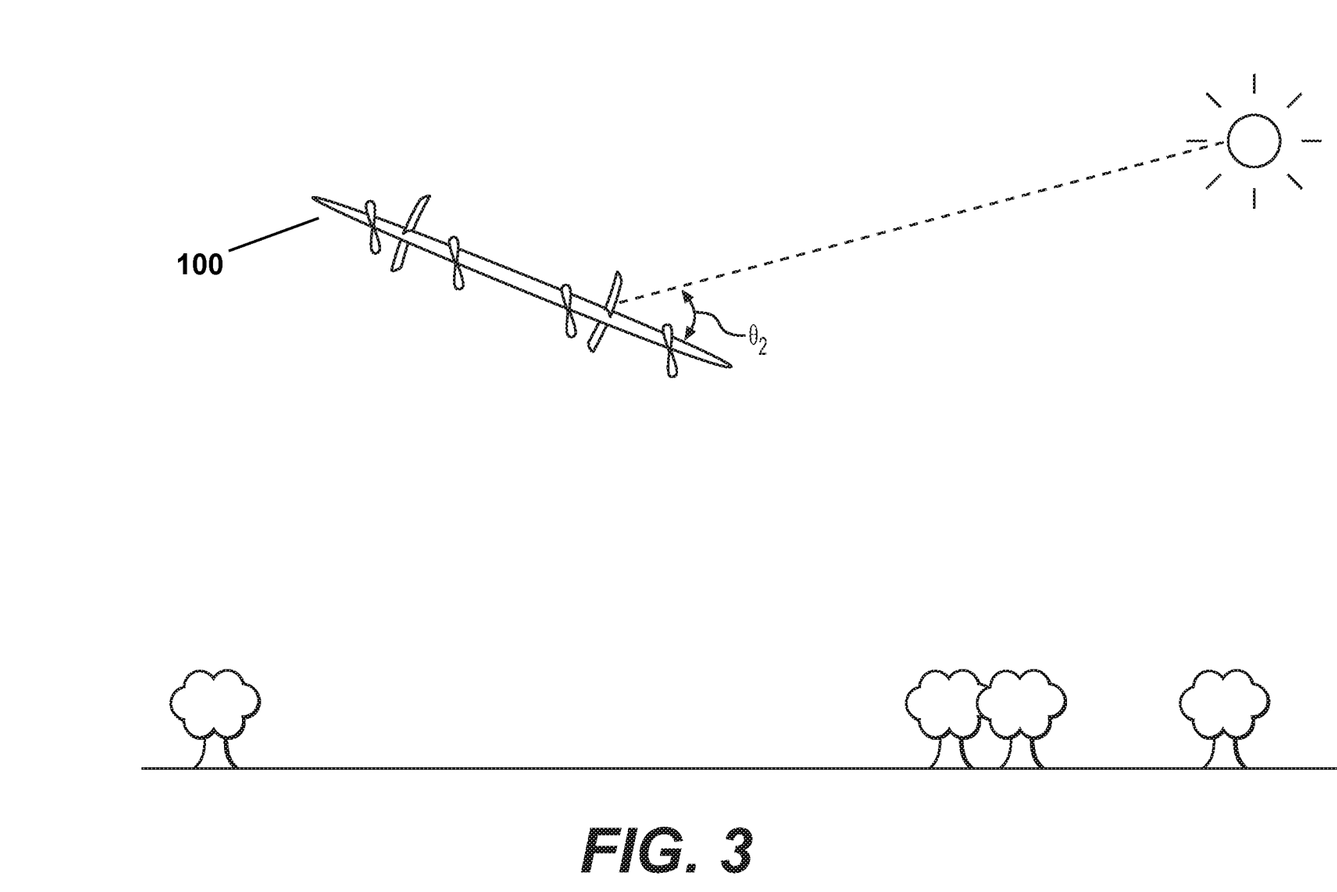
FIG. 3 illustrates an example aircraft that may maintain straight flight in a banked orientation.

FIG. 3 illustrates an example aircraft 100 that may maintain straight flight in a banked orientation. To capture more sunlight even when the sun is low in the sky, aircraft 100 may orient itself in a banked position. When the aircraft is flying straight in a banked orientation, the angle between first wings 110 and sunlight emanating from the Sun may be $\theta_2$, which may be a larger angle than $\theta_1$. The increased angle at this banked orientation may enable the solar cells affixed to first wings 110 to capture more sunlight than if aircraft 100 were flying in an unbanked orientation. To fly in a banked orientation, aircraft 100 may rotate with respect to the lateral axis associated with aircraft 100, yet remain fixed with respect to the vertical axis and the longitudinal axis associated with aircraft 100. During banked flight, second wings 120 may produce lift. As an example and not by way of limitation, first wings 110 may have a total surface area of 4 S and may generate a lifting force of 4 L. Second wings 120 may have a total surface area of 1 S and may generate a lifting force of 1 L. In this scenario, straight flight in a banked orientation may be possible at a bank angle of 14 degrees. This may be because $\tan^{-1}(1/4)=14$ degrees. Continuing with the example, suppose that the sun is level with the horizon and aircraft 100 is flying straight at a bank angle of 14 degrees. The total area of first wings 110 and second wings 120 that is projecting toward the Sun may be 4 s*sin(14)+S*cos(14)=1.93 S. This is almost double the area eligible to capture sunlight if aircraft 100 were flying in an unbanked orientation when the sun is at the horizon. If the Sun is at the horizon and the airplane 100 is flying in an unbanked orientation, first wings 110 may be unable to capture any sunlight because the angle between first wings 110 and sunlight emanating from the Sun may be 0 degrees. If the Sun is at the horizon and the airplane 100 is flying in an unbanked orientation, the angle between second wings 120 and sunlight emanating from the Sun may be 90 degrees. Thus the total area of first wings 110 and second wings 120 that is projecting toward the Sun when the aircraft is flying in an unbanked orientation may be 4 s*sin(0)+ S*cos(0)=S. Thus, aircraft 100 may significantly increase the total area of aircraft 100 that is projecting toward the Sun by flying straight in a banked orientation, as shown by FIG. 3. In particular embodiments, second wings 120 with area S may generate much more lifting force with a higher angle of attack. The angle of attack may be the angle between the oncoming air and the wing as viewed from the front of aircraft 100. Increasing the angle of attack may enable aircraft 100 to use smaller second wings 120 and still maintain straight flight at a bank angle of 14 degrees. Although this disclosure describes providing an aircraft that may fly in a straight path in a banked orientation in a particular manner, this disclosure contemplates providing an aircraft that may fly in a straight path in a banked orientation in any suitable manner.

Figure 4A:
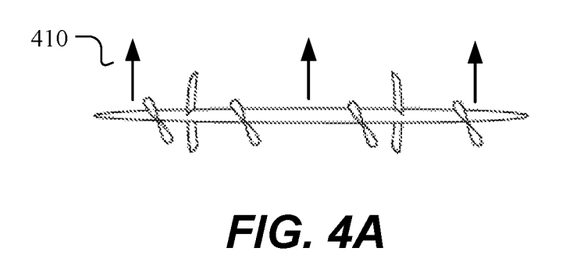
FIG. 4A illustrates an example force diagram of an example aircraft that may maintain a straight flight path in a banked orientation.
Figure 4B:
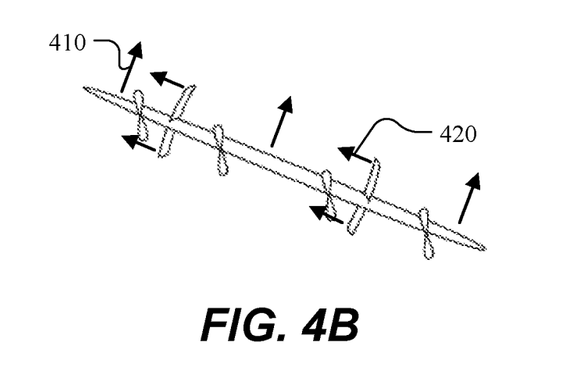
FIG. 4B illustrates another example force diagram of an example aircraft that may maintain a straight flight path in a banked orientation.

FIGS. 4A and 4B illustrate example force diagrams of an example aircraft that may maintain a straight flight path in a banked orientation. Lifting forces 410 and 420 represent the lifting force produced by first wings 110 and 120, respectively. When the aircraft is flying in an unbanked orientation (e.g., level) as shown by FIG. 4A, the only wings producing a lifting force may be first wings 110. This may mean that no centripetal (e.g., horizontal) forces are acting on the aircraft, aside from environmental forces (e.g., wind, magnetic forces). When the aircraft is flying in a banked orientation as shown in FIG. 4B, second wings 120 may produce a lifting force as shown by lifting force 420 in addition to the lifting force produced by first wings 110 as shown by lifting force 410. Lifting forces 410 and 420 may have a magnitude and a direction. The magnitude of lifting forces 410 and 420 may depend on the bank angle of aircraft 100. The magnitude of lifting forces 410 and 420 may be inversely related. As the bank angle of aircraft 100 increases, the magnitude of the lifting force 410 produced by first wings 110 may decrease and the magnitude of the lifting force 420 produced by second wings 120 may increase. The direction of the lifting forces 410 and 420 may be perpendicular to one another, regardless of the bank angle of aircraft 100. When aircraft 100 flies in a banked orientation, lifting forces 410 and 420 may each have a vertical component and a horizontal component, as can be seen in FIG. 4B. Depending on the relative size of first wings 110 and second wings 120, there may exist a bank angle wherein the horizontal component of the lifting force 410 produced by first wings 110 is equal in magnitude to the horizontal component of the lifting force 420 produced by second wings 120. Because lifting forces 410 and 420 are perpendicular, their horizontal components are opposite in direction. Thus, when the bank angle of aircraft 100 causes the magnitude of lifting force 420 and the magnitude of lifting force 110 to equal one another, the horizontal components of lifting force 110 and lifting force 120 may cancel each other out. This may cause the net force acting on aircraft 100 to be completely vertical. As a result, the aircraft may experience no centripetal (e.g., horizontal) force produced by either first wings 110 or second wings 120 and may be able to maintain straight flight in a banked orientation.

In particular embodiments, to enable aircraft 100 to maintain a straight flight path in a banked orientation, second wings 120 may rotate with respect to a vertical axis (e.g., yaw axis) associated with aircraft 100, yet remain fixed with respect to the lateral and longitudinal axes associated with aircraft 100. As aircraft 100 orients itself into a banked orientation, second wings 120 may rotate so that their angle of attack causes second wings 120 to generate a lifting force. Because second wings 120 may be a symmetrical airfoil, second wings 120 may not automatically generate lift if the angle of attack is flat (e.g., the angle between the oncoming air and the plane bisecting second wings 120 is zero degrees). This may be because a symmetrical airfoil is unable to generate lift at a zero-degree angle of attack. Thus, when aircraft 100 is flying in a banked orientation, second wings 120 may rotate so that the angle of attack becomes positive and second wings 120 generate a lifting force. Although this disclosure describes generating a lifting force by second wings 120 in a particular manner, this disclosure contemplates generating a lifting force by second wings 120 in any suitable manner.

In particular embodiments, second wings 120 may generate a lifting force without rotating with respect to a vertical axis associated with aircraft 100. As an example and not by way of limitation, aircraft 100 may rotate with respect to a vertical axis (e.g., yaw axis) associated with aircraft 100. This may create a sideslip angle, which may be understood to mean an aerodynamic state where aircraft 100 is moving somewhat sideways as well as forward relative to the oncoming airflow. This may be accomplished by using differential thrust on propellers 130 or by angling the rudders on the tail of aircraft 100. The sideslip angle may become the angle of attack for second wings 120. As an example and not by way of limitation, if aircraft 100 is banking left (e.g., the orientation of aircraft 100 is such that the left tip of first wings 110 is lower than the right tip of first wings 110), to generate a lifting force on second wings 120, aircraft 100 may need to rotate right with respect to the vertical (e.g., yaw) axis. Likewise, if aircraft 100 is banking right (e.g., the orientation of aircraft 100 is such that the right tip of first wings 110 is lower than the left tip of first wings 110), to generate a lifting force on second wings 120, aircraft 100 may need to rotate left with respect to the vertical (e.g., yaw) axis. Although this disclosure describes generating a lifting force by second wings 120 in a particular manner, this disclosure contemplates generating a lifting force by second wings 120 in any suitable manner.

In particular embodiments, aircraft 100 may be equipped with one or more processors; and a memory coupled to the processors comprising instructions executable by the processors. The processors may be operable when executing the instructions to orient the aircraft at a plurality of bank angles. In particular embodiments, each bank angle of the plurality of bank angles may be based on a position of the Sun. As an example and not by way of limitation, if aircraft 100 is flying north in a straight line, the processors on aircraft 100 may be programmed to orient the aircraft in a right-banked orientation during the morning when the sun is rising in the east. Thus, the right wingtip of aircraft 100 may be positioned lower than the left wingtip during the morning, and more of the surface area of the aircraft may be projecting toward the Sun. This may enable more sunlight to be captured by solar cells affixed to the aircraft's first wings 110 and second wings 120. As the Sun rises during the course of the day, the processors may be programmed to orient the aircraft such that the surface area of first wings 110 track the sun. Thus, during the middle of the day when the Sun is overhead, the aircraft may fly in a flat orientation (e.g., left wingtip and right wingtip are level). And during the end of the day when the sun is setting in the West, the aircraft may automatically orient itself in a left-banked orientation, which may mean that the left wingtip is below the right wingtip. In this manner, the solar cells on aircraft 100 may be able to increase the amount of sunlight they capture as compared to an aircraft that flies at a level orientation throughout the entire day. Although this disclosure describes tracking the Sun in a particular manner, this disclosure contemplates tracking the Sun in any suitable manner.

Figure 5:
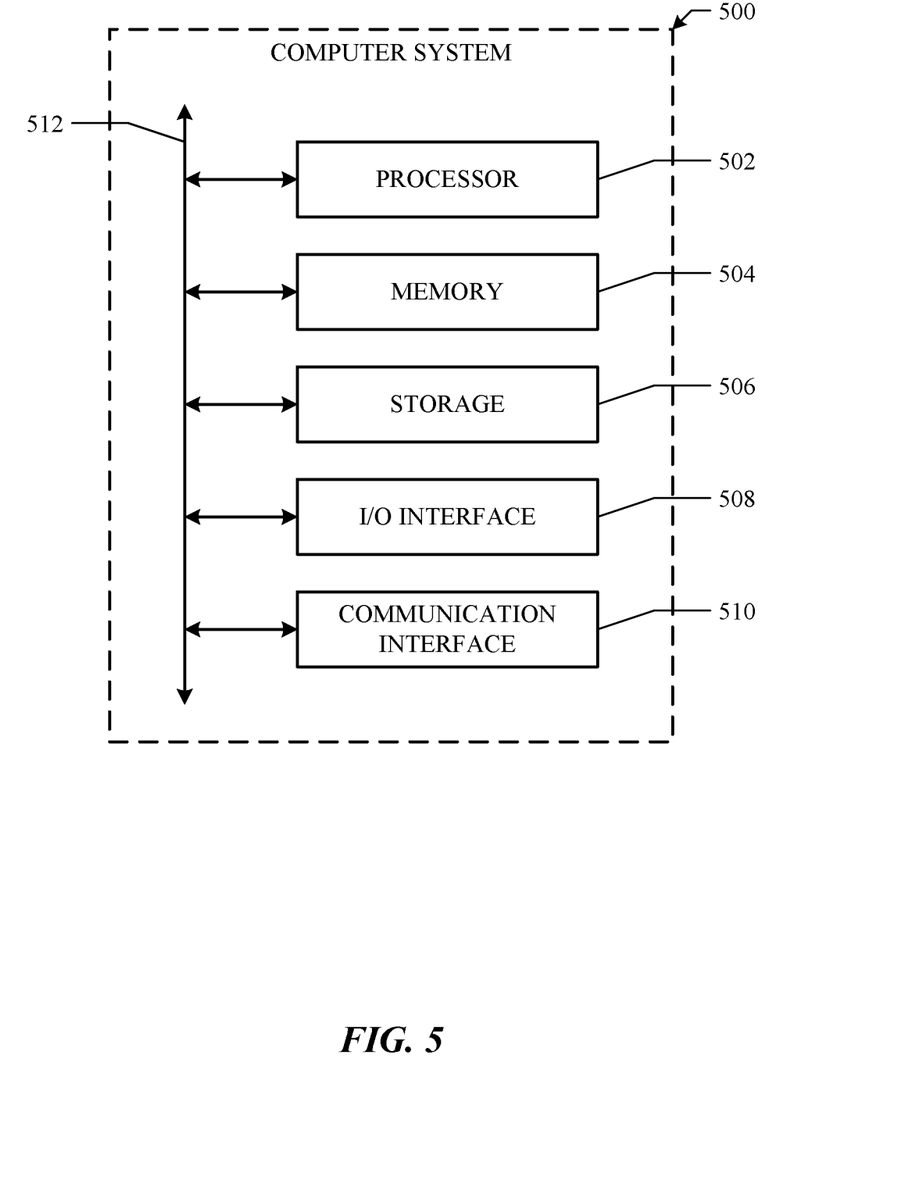
FIG. 5 illustrates an example computer system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. An aircraft comprising:
    one or more first wings configured to produce lift in a first direction when the aircraft is moving in a second direction that is substantially perpendicular to the first direction, wherein the first wings also produce a centripetal force when the aircraft is banking while moving in the second direction; and
    one or more second wings affixed and oriented substantially perpendicular to the first wings and configured to produce a counter force in a third direction that is substantially perpendicular to both the first direction and the second direction, wherein the counter force reduces the centripetal force when the aircraft is banking;
    one or more sensors configured to track a position of the Sun;
    a real time computer system comprising:
        one or more processors; and
        a memory coupled to the processors comprising instructions executable by the processors, the processors being operable when executing the instructions to automatically orient the aircraft at a bank angle, wherein the bank angle is based on the position of the Sun, wherein the bank angle is further based on a ratio of a surface area of the one or more second wings and a surface area of the one or more first wings.

2. The aircraft of claim 1, wherein the one or more second wings rotate with respect to a vertical axis associated with the aircraft.

3. The aircraft of claim 1, wherein the one or more second wings remain fixed with respect to both a longitudinal axis and a lateral axis associated with the aircraft.

4. The aircraft of claim 1, wherein a horizontal component of the counter force is substantially equal to the centripetal force.

5. The aircraft of claim 1, wherein a horizontal component of the counter force and the centripetal force act on the aircraft in opposite directions.

6. The aircraft of claim 1, wherein one or more solar panels are mounted to the first wings or to the second wings.

7. The aircraft of claim 1, wherein each of one or more of the second wings comprises a symmetrical airfoil.

8. The aircraft of claim 1, wherein the second wings are further configured to increase an angle between the first wings and a line of sunlight.

9. The aircraft of claim 1, wherein the first wings and the second wings are configured to enable the aircraft to fly in a banked orientation while moving in the second direction.

10. The aircraft of claim 1, wherein one of the bank angle of the plurality of bank angles is 14 degrees.

11. The aircraft of claim 1, wherein a positive bank angle relative to the Sun results in a power absorption by one or more solar panels affixed to the first wings that is greater than a power absorption by the one or more solar panels when the bank angle is 0 degrees.

12. The aircraft of claim 1, wherein the counter force in the third direction is produced when the aircraft rotates with respect to a vertical axis while moving in the second direction.

13. The aircraft of claim 1, wherein the ratio is an inverse tangential relation between the surface area of the one or more second wings and the surface area of the one or more first wings.

* * * * *